(No Model.)
H. H. STEVENS.
CLIP FOR HOLDING WHEEL TIRES.
No. 504,117. Patented Aug. 29, 1893.
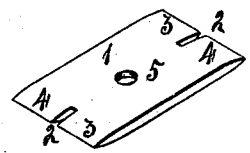
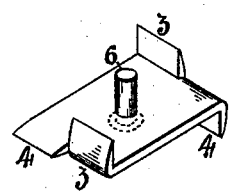
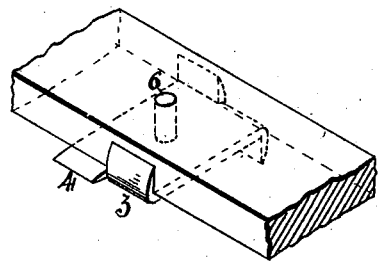
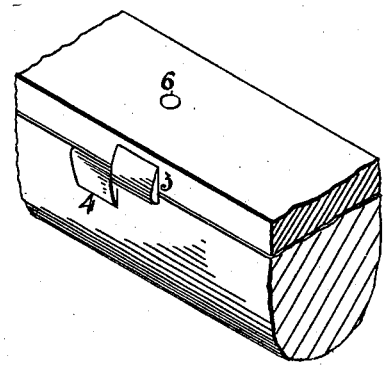
Witnesses:
J. R. Evans
J. E. Behel
Inventor:
Henry H. Stevens
By A. O. Behel
Atty.

UNITED STATES PATENT OFFICE.

HENRY H. STEVENS, OF MARENGO, ILLINOIS.

CLIP FOR HOLDING WHEEL-TIRES.

SPECIFICATION forming part of Letters Patent No. 504,117, dated August 29, 1893.

Application filed November 10, 1892. Serial No. 451,516. (No model.)

*To all whom it may concern:*

Be it known that I, HENRY H. STEVENS, a citizen of the United States, residing at Marengo, in the county of McHenry and State of Illinois, have invented certain new and useful Improvements in Clips for Holding the Tires of Vehicle-Wheels in Position, of which the following is a specification.

The object of this invention is to hold the tires of vehicle wheels in their connection with the felly and in such a manner that it may be readily removed therefrom.

In the accompanying drawings—Figure 1 is an isometrical representation of my improved clip in its outstretched position. Fig. 2 is an isometrical representation of the clip having three lips thereof bent, which is the position they will occupy when the clip is placed upon the market. Fig. 3 is an isometrical representation of the clip in position upon the tire. Fig. 4 is an isometrical representation of my improved clip in position.

Tires of vehicle wheels are now held in position by bolts passing through the tire and felly, receiving a nut on the felly side, and when it becomes necessary to reset the tire the bolts must be withdrawn, and by this arrangement the tire is greatly weakened and it is to overcome this disadvantage that I have constructed my clip, which is made from metal which may be bent, such as malleable iron, brass or plate material, and consists of a base plate 1, provided with slots 2, dividing the ends of the base into lips 3 and 4 and having a central opening 5. The lips 3 and one of the lips 4 are bent in the position shown at Fig. 2, which is the condition of the clip when placed upon the market.

In placing the clip in position for uniting the tire and the felly of a vehicle wheel, I prefer to place the clip on the inside of the tire so that the lips 3 will embrace the tire and the stud 6 will enter the hole therein, as shown at Fig. 3. The tire is then placed upon the felly so that the base plate 1, of the clip will lie between the meeting faces of the tire and felly and the downturned lip 4 will properly enter the tire with respect to the felly, when the straight lip 4 is bent to embrace the felly which will hold the tire in position upon the felly. The clip may be placed upon the tire either before or after it has been heated. When it becomes necessary to remove the tire for any purpose, one of the lips 4 is straightened, which will permit the tire to be withdrawn from the felly. I prefer to locate these clips one over each spoke in order that the lips 4 will serve to strengthen the felly at these points which are made weak owing to the mortise being cut therein to receive the tenon of the spoke.

I claim as my invention—

A clip for holding the tires of vehicle wheels in position consisting of a plate interposed between the tire and felly, said plate provided with lips to engage the felly and a stud to engage the tire.

HENRY H. STEVENS.

Witnesses:
   A. O. BEHEL,
   J. R. EVANS.